(12) United States Patent
Laughlin et al.

(10) Patent No.: US 8,358,774 B2
(45) Date of Patent: Jan. 22, 2013

(54) ENTERPRISE-WIDE OCCUPANCY BASED ROUTING

(75) Inventors: Judith Laughlin, Covington, WA (US); Mark Michelson, Elburn, IL (US); Roger A. Sumner, Batavia, IL (US)

(73) Assignee: Aspect Software, Inc., Chelmsford, MA (US)

( * ) Notice: Subject to any disclaimer, the term of this patent is extended or adjusted under 35 U.S.C. 154(b) by 1915 days.

(21) Appl. No.: 11/128,045

(22) Filed: May 12, 2005

(65) Prior Publication Data
US 2006/0256955 A1 Nov. 16, 2006

(51) Int. Cl.
*H04M 3/00* (2006.01)
(52) U.S. Cl. .......... 379/266.07; 379/265.02; 379/266.01
(58) Field of Classification Search ............. 379/265.01, 379/265.06, 266.01, 266.07
See application file for complete search history.

(56) References Cited

U.S. PATENT DOCUMENTS

| | | | |
|---|---|---|---|
| 5,291,550 A | 3/1994 | Levy et al. | |
| 5,530,744 A | 6/1996 | Charalambous et al. | |
| 5,555,179 A | 9/1996 | Koyama et al. | |
| 5,696,809 A | 12/1997 | Voit | |
| 5,765,033 A | 6/1998 | Miloslavsky | |
| 5,828,747 A | 10/1998 | Fisher et al. | |
| 5,864,617 A | 1/1999 | Donnelly | |
| 5,926,539 A | 7/1999 | Shtivelman | |
| 5,946,387 A | 8/1999 | Miloslavsky | |
| 5,953,332 A | 9/1999 | Miloslavsky | |
| 5,953,405 A | 9/1999 | Miloslavsky | |
| 6,002,760 A | 12/1999 | Gisby | |
| 6,021,428 A | 2/2000 | Miloslavsky | |
| 6,044,145 A | 3/2000 | Kelly et al. | |
| 6,044,368 A | 3/2000 | Powers | |
| 6,067,357 A | 5/2000 | Kishinsky et al. | |
| 6,108,711 A | 8/2000 | Beck et al. | |
| 6,138,139 A | 10/2000 | Beck et al. | |
| 6,167,395 A | 12/2000 | Beck et al. | |
| 6,170,011 B1 | 1/2001 | Beck et al. | |
| 6,175,563 B1 | 1/2001 | Miloslavsky | |
| 6,175,564 B1 | 1/2001 | Miloslavsky et al. | |
| 6,185,292 B1 | 2/2001 | Miloslavsky | |
| 6,345,305 B1 | 2/2002 | Beck et al. | |

(Continued)

FOREIGN PATENT DOCUMENTS
EP 0 740 450 A 10/1996
EP 1 056 264 11/2000
(Continued)

*Primary Examiner* — Rasha Al Aubaidi
(74) *Attorney, Agent, or Firm* — Husch Blackwell LLP

(57) ABSTRACT

A method and apparatus are provided for routing a contact with a client to one of a plurality of automatic contact distributors, each having a plurality of agents, by a network router. The method includes the step of determining by each automatic contact distributor of the plurality of automatic contact distributors a largest relative difference between a target occupancy and actual occupancy of each agent among the plurality of agents of the automatic contact distributor and for each contact type processed by the automatic contact distributor. The method further includes the steps of each of the plurality of automatic contact distributors transferring a value of the determined, largest relative difference for each contact type to the network router, the network router detecting a contact, the network router determining a contact type of the detected contact and the network router routing the detected contact to an automatic contact distributor of the plurality of automatic contact distributors that provided a largest relative difference for the determined contact type among the plurality of automatic contact distributors.

36 Claims, 3 Drawing Sheets

U.S. PATENT DOCUMENTS

| | | |
|---|---|---|
| 6,373,836 B1 | 4/2002 | Deryugin et al. |
| 6,389,007 B1 | 5/2002 | Shenkman et al. |
| 6,393,015 B1 | 5/2002 | Shtivelman |
| 6,553,114 B1 * | 4/2003 | Fisher et al. ............. 379/265.12 |
| 6,633,640 B1 | 10/2003 | Cohen et al. |
| 6,732,156 B2 | 5/2004 | Miloslavsky |
| 6,744,877 B1 | 6/2004 | Edwards |
| 2003/0059029 A1 | 3/2003 | Mengshoel et al. |
| 2003/0095652 A1 * | 5/2003 | Mengshoel et al. ..... 379/265.06 |
| 2007/0286394 A1 * | 12/2007 | Hahn et al. ............... 379/265.02 |

FOREIGN PATENT DOCUMENTS

| | | |
|---|---|---|
| EP | 1 122 937 | 10/2004 |
| GB | 2 345 819 A | 7/2000 |
| WO | WO 02/093892 | 11/2002 |

* cited by examiner

Fig. 4

|    |              | CT1 | CT2 | CT3 | CT4 | CT5 | CT6 | CT7 | CT8 | CT9 | CT10 |
|----|--------------|-----|-----|-----|-----|-----|-----|-----|-----|-----|------|
| 1  | 1223-456-7890 |     |     |     |     | AC3 |     |     |     |     |      |
| 2  | 123-456-7891 | AC1 |     |     |     |     |     |     |     |     |      |
| 3  | 123-456-7892 |     |     |     |     |     |     |     |     |     |      |
| 4  | 123-456-7893 |     |     | AC2 |     |     |     |     |     |     |      |
| 5  | 234-567-8901 |     |     |     |     |     |     |     |     |     | AC2  |
| 6  | 234-567-8902 |     |     |     |     |     |     |     |     |     |      |
| 7  | 234-567-8903 |     |     |     | AC3 |     |     |     |     |     |      |
| 8  | 234-567-8904 |     |     |     |     |     |     |     |     |     |      |
| 9  | 345-678-9012 |     | AC1 |     |     |     |     |     |     |     |      |
| 10 | 345-678-9013 |     |     |     |     |     | AC3 |     |     |     |      |
| 11 | 345-678-9014 |     |     |     |     |     |     |     |     |     |      |
| 12 | URL1         |     |     |     |     |     |     |     | AC1 |     |      |
|    | ∘∘∘          |     |     |     |     |     |     |     |     |     |      |
| 13 | URLN         |     |     |     |     |     |     |     |     | AC2 |      |
| 14 | E-MAIL 1     |     |     |     |     |     |     |     |     |     |      |
|    | ∘∘∘          |     |     |     |     |     |     |     |     |     |      |
| 15 | E-MAIL M     |     |     |     |     |     |     |     | AC1 |     |      |

400

ENTERPRISE-WIDE OCCUPANCY BASED ROUTING

FIELD OF THE INVENTION

The field of the invention relates to communication systems and more particularly to call centers.

BACKGROUND OF THE INVENTION

Automatic call distributors (ACDs) are known. Such systems are typically used by organizations to serve large numbers of callers through the Public Switched Telephone Network (PSTN). Typically, inbound calls are directed to a common telephone number of the organization and distributed to agents based upon some criteria (e.g., agent idle time).

In addition to handling inbound calls, ACDs may also process outbound calls. Typically, a controller monitors a workload of its agents. Where a workload of received calls falls below some threshold value, the controller may begin to initiate outbound calls.

In addition to placing and distributing calls, an ACD may also identify and display documents on agent terminals as an aid to processing the calls. In the case of incoming calls, the calls may be received along with dialed number identification service (DNIS) and/or automatic number identification (ANI) information. ANI may be used to identify a caller at the same instant as the call is delivered to the ACD. The controller of the ACD may use the ANI information to retrieve and display customer records on a terminal of the agent selected to handle the call at the same instant that the call is delivered to the agent.

In addition, textual information may be displayed on a terminal of the agent that guides the agent through a sales presentation. DNIS information may be used to identify an intended call target and to select an appropriate sales presentation for use by the agent based upon the intended call target.

While automatic call distributors work relatively well, their use is dependent upon the availability of an appropriate number of agents. If a supervisor estimates too low or too high on the number of agents needed, then not all of the calls can be answered or there are too few calls to occupy all of the agents.

In addition, organizations often locate call centers in widely dispersed geographic areas in order to reduce toll charges, avoid service discontinuities and exploit local labor availabilities. However, the flow of incoming calls is not always equal at each of the call centers. In some cases, one call center may be overloaded while in another, agents may be idle. Accordingly, a need exists for a method of balancing the loading among call centers that is based upon the loading of individual agents and is not based upon the time of a call in a call queue or a call abandonment rate.

SUMMARY

A method and apparatus are provided for routing a contact with a client to one of a plurality of automatic contact distributors, each having a plurality of agents, by a network router. The method includes the step of determining by each automatic contact distributor of the plurality of automatic contact distributors a largest relative difference between a target occupancy and actual occupancy of each agent among the plurality of agents of the automatic contact distributor and for each contact type processed by the automatic contact distributor. The method further includes the steps of each of the plurality of automatic contact distributors transferring a value of the determined, largest relative difference for each contact type to the network router, the network router detecting a contact, the network router determining a contact type of the detected contact and the network router routing the detected contact to an automatic contact distributor of the plurality of automatic contact distributors that provided a largest relative difference for the determined contact type among the plurality of automatic contact distributors.

BRIEF DESCRIPTION OF THE DRAWINGS

FIG. 4 is a lookup table that may be used by a network router of the system of FIG. 1.

DETAILED DESCRIPTION OF AN ILLUSTRATED EMBODIMENT

Figure 1:
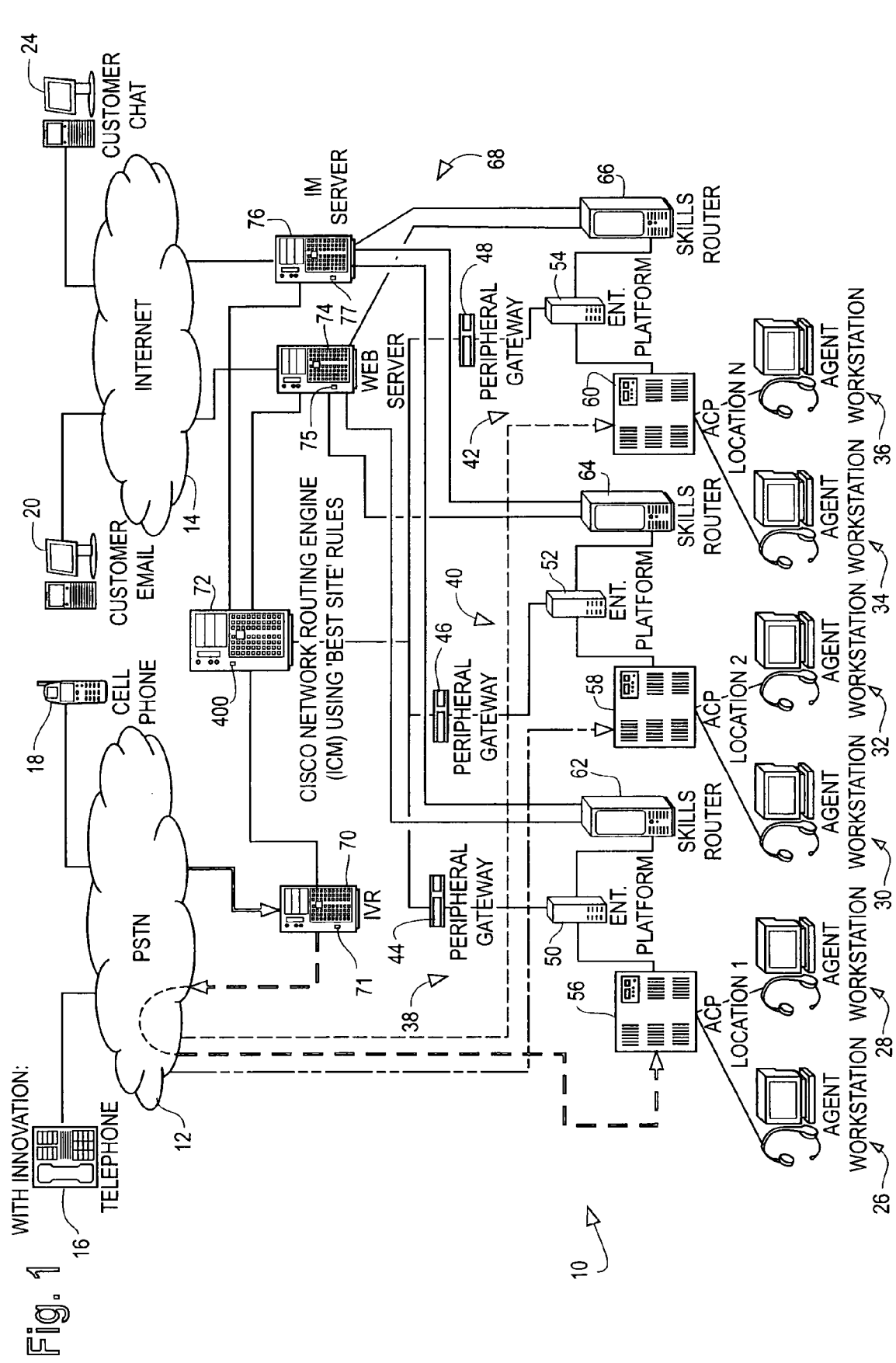
FIG. 1 is a block diagram for performing system-wide routing based upon occupancy under an illustrated embodiment of the invention.

FIG. 1 is a block diagram of a contact routing system 10 in accordance with an illustrated embodiment of the invention. The contact distribution system may be used for connecting contacts through the Public Switch Telephone Network (PSTN) 12 or Internet 14 between clients 16, 18, 20, 24 and agents 26, 28, 30, 32, 34, 36. In general, the system 10 may be used by any of a number of different enterprise organizations (e.g., commercial, environmental, political, etc.) to advance the agenda of the enterprise.

In general, FIG. 1 shows three separate automatic contact distribution systems 38, 40, 42 although the concepts described herein may be applied to any number of contact distribution systems. The first automatic contact distributor 38 may include a peripheral gateway 44, an enterprise server 50, a switch 56, a skills router 62 and a number of agent stations 26, 28. The second automatic contact distributor 40 may include a peripheral gateway 46, an enterprise server 52, a switch 58, a skills router 64 and a number of agent stations 30, 32. Similarly, the third automatic contact distributor 42 may include a peripheral gateway 48, an enterprise server 54, a switch 60, a skills router 66 and a number of agent stations 34, 36.

The automatic contact distributors 38, 40, 42 may be located in geographically diverse locations. A load balancing system 68, including a network router 72, an Interactive Voice Response (IVR) unit 70, a web server 74 and an Instant Message (IM) server 76, may distribute contacts to the geographically diverse automatic contact distributors 38, 40, 42 based upon agent loading. The network router 72 is not an Internet router, but instead is a router located at a network level of the PSTN.

In general, the balancing system 68 routes contacts to the three automatic contact distributors 38, 40, 42 based upon agent loading information transferred to the network router 72 from the three automatic distributors 38, 40, 42. In this regard, a respective enterprise server 50, 52, 54 may collect and process information regarding agent loading within the respective automatic contact distributor 38, 40, 42 and transfer the determined loading through a respective peripheral gateway 44, 46, 48 to the network router 72.

The information collected and forwarded by the enterprise platform may differ based upon the operating mode of the automatic contact distributor. For example, in an understaffed situation (contacts waiting for agents), the enterprise platform 50, 52, 54 may calculate an estimated time until a qualified agent becomes available. In contrast, in a neutral or an overstaffed situation, the enterprise platform may operate to identify an agent who would benefit the most from a contact assignment of a particular contact type.

In order to ensure the equitable distribution of calls, the automatic contact distributors 38, 40, 42 may rely upon a comparison of target and actual occupancies of the individual agents to determine loading at an agent level. As used herein, a target occupancy of an agent is a predetermined target percentage of work time during any one time period that a supervisor assigns an agent to spend on any one or more contact types. Similarly, actual occupancy is the actual percentage of total time during any one time period that the agent has actually spent on any contact type. Any difference between target and actual occupancy (i.e., an occupancy difference) refers to a comparison of occupancy values for a single contact type assigned to a single agent.

In order to equitably assign contacts, a supervisor may determine the number of full time equivalent (FTE) agents needed during a time period for each contact type and staff the automatic contact distributors accordingly. For example, if a contact type requires one FTE agent, then giving two agents a target occupancy of 50% (or four agents a target occupancy of 25%) would suffice for the contact type.

Once a target occupancy is determined for a contact center 38, 40, 42 and an adequate number of agents are provided, the skill routers 62, 64, 66 may begin to assign contacts. In general, as each contact is received, the contact is classified by contact type. Classification may be based upon the identity of the client, the intended destination of the contact or even based upon additional information provided by the client during the contact with the balancing system 68 or contact center 38, 40, 42.

To assign a contact to an agent 26, 28, 30, 32, 34, 36, the skills router 62, 64, 66 may compare the target occupancy and actual occupancy of each agent and assign the contact to the agent with the greatest relative occupancy deviation (difference) for that contact type. Assigning contacts to the agent with the greatest relative occupancy deviation has the effect of causing the relative occupancy deviation among agents to converge over time.

In order to route calls from the balancing system 68 to the contact distributors 38, 40, 42, the contact distributors 38, 40, 42 may each transfer a measure of their relative loading to the network router 72 of the balancing system 68. Under one illustrated embodiment, each contact distributor 38, 40, 42 may identify and transfer a value of the greatest relative deviation between target and actual occupancy among the agents for each contact type to the router 72. The router 72, in turn, may then identify the greatest relative value among the transferred values from the contact distributors 38, 40, 42 for that contact type and assign the contact to the contact distributor 38, 40, 42 that provided the identified greatest relative value.

Figure 2:
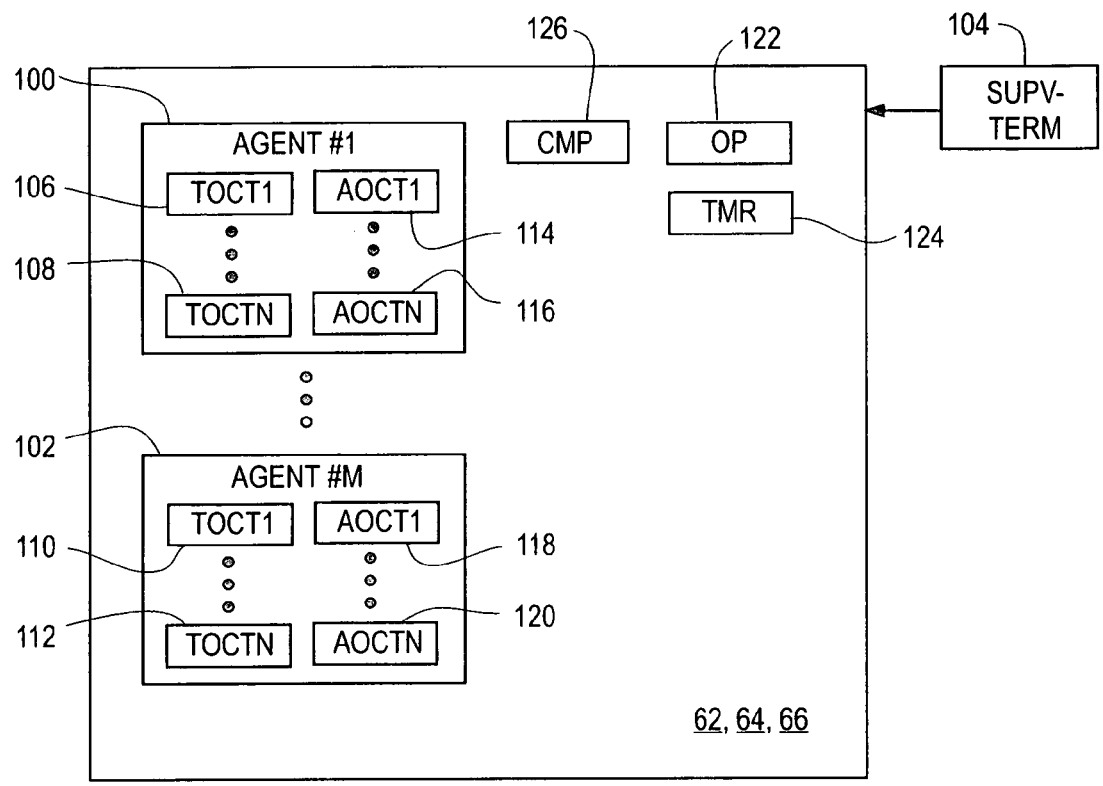
FIG. 2 is a block diagram of a skills router that may be used by the system of FIG. 1.

Turning first to the skills routers 62, 64, 66, the skills routers 62, 64, 66 may first receive a target occupancy from a supervisor. FIG. 2 depicts a skills router 62, 64, 66 with agent files 100, 102 (agent files 100, 102 may be considered as exemplary of the files that would be provided within the respective skill router 62, 64, 66 for agents 26, 28, 30, 32, 34, 36). As shown in FIG. 2, each agent 100, 102 may receive a target occupancy 106, 108, 110, 112 for each of N contact types. It should be noted in this regard, that the total occupancy of the target occupancies 106, 108, 110, 112 do not need to add up to 100%, because the supervisor 104 may intentionally reserve some portion of the agent's time for paperwork.

As each contact arrives, an occupancy processor 122 may determine a type of the contact from contact associated and other information. From the contact type, a comparator 126 may compare a target occupancy 106, 108, 110, 112 with an actual occupancy 114, 116, 118, 120 of each agent with an occupancy in that contact type. In this regard, the actual occupancy of an agent may be subtracted from the target occupancy of the agent and the difference value (i.e., the occupancy deviation or occupancy difference) may be normalized to a value from 0 to 100. The deviation or difference value among agents 100, 102 having an occupancy in that contact type may be compared and the agent with the largest (positive) relative value may be chosen to receive that contact.

As each contact is assigned to an agent 100, 102, a timer 124 may be activated to measure the time that the agent 100, 102 spends handling the call. The measured time of each agent 100, 102 for each contact type may be separately accumulated during a time period and divided by the time period to adjust the actual occupancy 114, 116, 118, 120 for that contact type and that agent 100, 102.

Turning now to the load balancing system 68, an explanation will be provided of how the target occupancy and actual occupancies of the contact distributors 38, 40, 42 may be used to balance the loads among the contact distributors 38, 40, 42. In this regard, the enterprise servers 50, 52, 54 may periodically send a value of the highest relative occupancy deviation for each contact type to the load balancing system 68.

The enterprise servers 50, 52, 54 may obtain the occupancy deviation for each respective agent of their respective contact distributor 38, 40, 42 by automatically requesting the occupancy deviation each time a contact arrives and the skill router 62, 64, 66 calculates these values for purposes of contact assignment or, alternatively, the enterprise servers 50, 52, 54 may simply request target and actual occupancy from the skill router 62, 64, 66 for each respective agents of their respective contact distributor 38, 40, 42. In the case where the enterprise server 50, 52, 54 requests target and actual occupancy, the enterprise sever 50, 52, 54 may subtract the actual occupancy from the target occupancy and normalize the difference to a value of from zero to one-hundred (for simplicity the normalized difference may also be referred to as the "occupancy difference").

Figure 3:
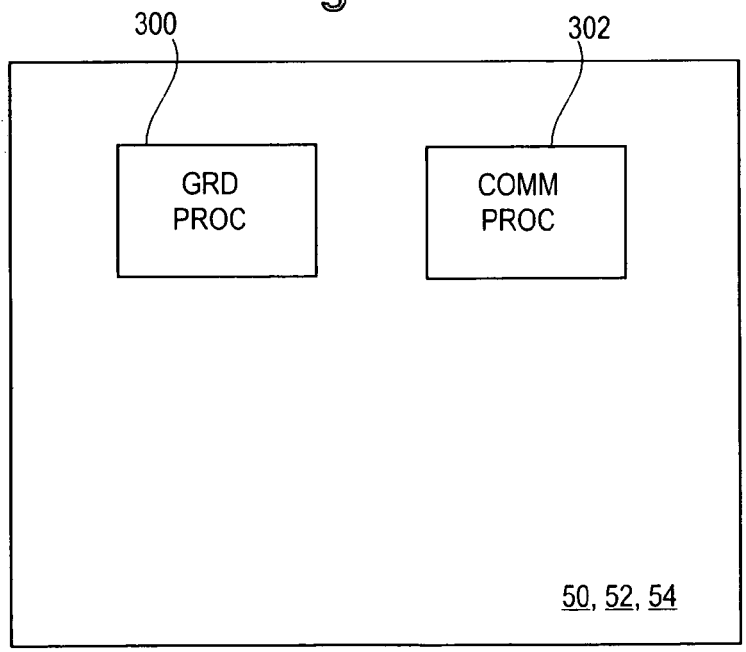
FIG. 3 is a block diagram of an enterprise server that may be used by the system of FIG. 1.

Once an occupancy difference has been calculated for each agent for each contact type, an ordering processor 300 (FIG. 3) within the enterprise server 50, 52, 54 may order the occupancy differences for each contact type based upon their relative values and select the occupancy difference (for each contact type) having the greatest relative value for transfer to the load balancing system 68.

In this regard, the ordering processor 300 may transfer the greatest relative value for the occupancy difference and identifier of the associated contact type to a communication processor 302. Within the communication processor 302, the information may be encoded into a data message to the network router 72 that includes at least three fields. The first field may include an identifier of the contact distributor 38, 40, 42. The second and third fields may be the value of the occupancy difference and the contact type identifier, respectively. The enterprise server 50, 52, 54 may periodically repeat this process for each contact type handled by the contact distributor 38, 40, 42.

The network router 72 may receive the transferred occupancy differences from each contact distributor 38, 40, 42 and perform a comparison among contact distributors 38, 40, 42 to identify the contact distributor 38, 40, 42 that provided the largest relative occupancy difference for each contact type. The network router 72 may place an identifier of the contact distributor 38, 40, 42 into a lookup table (400, FIG. 4) of the network server 72 indexed by the corresponding contact type.

For purposes of explanation, the reference "AC1" in FIG. 4 may refer to the first contact distributor 38, "AC2" may refer to the second contact distributor 40 and "AC3" may refer to the third contact distributor 42. Since AC1 is shown in the first column under contact type CT1, it may be assumed that AC1 provided the largest relative occupancy difference among the contact distributors AC1, AC2 and AC3 for contact type #1 (CT1). The ten-digit number in the left margin of the table 400 may refer to a telephone number of the contact distributor 38 on which contacts of contact type #1 are to be delivered. The use of the ten-digit telephone number (i.e., "123-456-7890") provides a method by which the load balancing system 68 may provide an indication of a contact type to the contact distribution system 38.

Turning now to the load balancing system 68, an explanation will be provided of how contacts are routed to the contact distributors 38, 40, 42. In this regard, the organization using the system 10 may disseminate (by publishing or otherwise) one or more contact identifiers of the organization (e.g., telephone numbers, website universal resource locators (URLs), e-mail addresses, etc.).

In one illustrated embodiment, one or more of the contact identifiers used by the organization may be a telephone number of an interactive voice response (IVR) 70. Other contact identifiers may be to a website within a web server 74. Still others may be instant message addresses within an IM server 76.

Each of the identifiers may provide the system 10 with an indicator of a contact type. However, as calls arrive at the IVR 70, call associated information (e.g., ANI, DNIS, etc.) delivered along with the call may provide additional information. In addition, an audio presentation made to the client 16, 18 by the IVR 70 through the switched circuit interface may allow the client 16, 18 to make additional selections. As the additional choices are offered, the selection of the choices may result in a contact that may have originally been a contact type #1 being reclassified into a contact type #2 or contact type #3 and so on.

For example, the organization may be a bank and the IVR 70 may offer verbal choices or mortgage services, savings account information, or general. If the caller selects "general" or does not make a choice, then the contact type may be determined to be a contact type #1. On the other hand, if the caller should select the "mortgages", then the contact type may be determined to be a contact type #3. Similarly, if the caller had chosen "checking" or "savings", then the contact type may be a contact type #4 or #5, respectively.

Upon detecting selections made by a client 16, 18, the IVR 70 (or network router 72) may identify a type of contact from the client 16, 18 by reference to a predetermined criteria involving the call associated information and/or the client selections or, alternatively, by reference to a lookup table 71. The IVR 70 may then transfer notification of the contact and contact type (or the call associated information and the selection information itself) to the network router 72.

Once the network router 72 receives notification of the contact, the network router 72 may (by reference to an identifier of the contact distributor under a column header of the call type in the lookup table of FIG. 4) determine a destination of the contact. To transfer the call, the network router 72 may retrieve the destination indicator (e.g., telephone number, URL, e-mail address, etc.) from the left margin and transfer the contact as indicated by the table 400.

To continue the example above, a contact is received through the PSTN 12 from a client 16, 18. The client 16, 18 was presented with audio options and made selections that allowed the contact to be classified as a contact type #1 (CT1). From the table 400, the network router 72 is able to identify the first contact distributor 38 (AC1) as being the contact destination. From the lookup table 400, the network router is also able to retrieve a system identifier (i.e., an ACD telephone number of 123-456-7890) where the contact is to be routed. In response, network router 72 transfers instructions back to the IVR 70 to transfer the contact to the determined ACD telephone number. The IVR 70, in turn, forwards a contact transfer instruction to a local switching office of the PSTN 12 that causes the contact to be transferred to the contact distributor 38.

In another embodiment, contacts may be received through the Internet 14 from clients 20, 24 and may be processed in a similar manner. In this regard, the system 10 may include a web server 74 that provides a website through which e-mail message may be exchanged with agents of the system 10. The system 10 may also include an instant message (IM) server 76 through which IM messages may be exchanged with the system 10. As with other contacts, e-mail and IM messages may be classified by contact type based upon call associated information (e.g., URL source or destination identifiers, e-mail source or destination identifiers, web page from which query originates, etc.).

Upon receipt of an e-mail by the web server 74, the e-mail may be classified by reference a predetermined criteria (as described above) or by reference to a lookup table 75. Similarly, an IM message may be classified by reference to a predetermined criteria or by reference to a corresponding lookup table 77. In either case, the servers 74, 76 may send a routing request to the network router 72. In response, the network router 72 by reference to the table 400 may retrieve a system address of a skills router 62, 64, 66 of the contact distributor 38, 40, 42 that is handling e-mails or IM messages of that particular contact type.

For example, the third contact distributor 40 may provide the greatest relative occupancy difference among the contact distributors for contact type #9 (CT9). An IM message may be received by the IM server 76 that is identified as being a contact type #9 and the IM server 76 transfers a contact notification containing such information.

By reference to the lookup table 400, the network router 72 identifies the second contact distributor 40 (AC2) under the heading of CT9 (row 13) with a system address of "URLN". The network router 72, in turn, transfers instruction to the IM server 76 to transfer the IM message to the skills router 64 for distribution to an agent 30, 32.

It should be noted that while the network router 72 receives an indication of contact distribution loading through the enterprise platforms 50, 52, 54, any contacts subsequently delivered to the contact distributors 38, 40, 42 may ultimately be delivered to a different agent. The reason for this is that the agent upon which the routing decision was made may have received another contact before the re-routed contact arrived.

A specific embodiment of method and apparatus for contact routing based upon enterprise-wide occupancy have been described for the purpose of illustrating the manner in which one possible alternative of the invention is made and used. It should be understood that the implementation of other variations and modifications of embodiments of the invention and its various aspects will be apparent to one skilled in the art, and that the various alternative embodiments of the invention are not limited by the specific embodiments described. Therefore, it is contemplated to cover all possible alternative embodiments of the invention and any and all modifications, variations, or equivalents that fall within the true spirit and scope of the basic underlying principles disclosed and claimed herein.

The invention claimed is:

1. A method of routing a contact with a client to one of a plurality of automatic contact distributors, each having a plurality of agents, by a network router, such method comprising the steps of:
   determining by each respective automatic contact distributor of the plurality of automatic contact distributors a respective largest relative occupancy difference among the plurality of agents of the respective automatic contact distributor for each contact type processed by the respective automatic contact distributor;
   each respective automatic contact distributor of the plurality of automatic contact distributors transferring the respective determined, largest relative occupancy difference for each contact type to the network router;
   comparing the respective transferred largest relative occupancy difference from each respective contact distributor for each respective control type to each other to identify a selected contact distributor with a highest transferred relative occupancy difference for each contact type to identify for each respective contact type a respective selected automatic contact distributor of the plurality of automatic contact distributors that has a highest difference for the respective contact type;
   detecting a contact;
   determining a contact type of the detected contact; and
   the network router routing the detected contact to an the selected automatic contact distributor of the plurality of automatic contact distributors that provided a largest one of the respective largest relative occupancy difference for the determined contact type among the plurality of automatic contact distributors.

2. The method of routing contacts as in claim 1 wherein the step of determining the largest relative occupancy difference among the agents further comprising ordering the agents of each automatic contact distributor of the plurality of automatic contact distributors based upon a relative value of a difference between target occupancy and actual occupancy of each agent.

3. The method of routing contacts as in claim 1 further comprising transferring an estimate of time until an agent becomes available in an understaffed situation.

4. The method of routing contacts as in claim 1 wherein the step of detecting the contact further comprises an interactive voice response unit receiving a switched circuit contact and detecting contact associated information through a public switch telephone network connection.

5. The method of routing contacts as in claim 4 further comprises the interactive voice response unit detecting client entered routing selection information entered through the switched circuit connection.

6. The method of routing contacts as in claim 5 further comprising the interactive voice response unit transferring the contact associated information and any detected client entered information to the network router.

7. The method of routing contacts as in claim 6 wherein the contact associated information further comprises a telephone number.

8. The method of routing contacts as in claim 7 further comprising the network router determining a destination telephone number for routing the contact based upon the contact associated information and any client entered information.

9. The method of routing contacts as in claim 8 further comprising the network router instructing the interactive voice response unit to re-route the contact to the automatic contact distributor providing the largest relative difference among the plurality of automatic contact distributors for the contact.

10. The method of routing contacts as in claim 1 further comprising defining the contact as an e-mail.

11. The method of routing contacts as in claim 10 further comprising the network router determining a routing destination for the e-mail based upon call associated information of the e-mail.

12. The method of routing contacts as in claim 11 further comprising the network router instructing a web server to re-route the e-mail to the automatic contact distributor providing the largest relative difference among the plurality of automatic contact distributors for the e-mail.

13. The method of routing contacts as in claim 1 further comprising defining the contact as an instant message.

14. The method of routing contacts as in claim 13 further comprising the network router determining a routing destination based upon call associated information of the instant message.

15. An apparatus for routing a contact with a client to one of a plurality of automatic contact distributors, each having a plurality of agents, by a network router, such apparatus comprising:
   means for determining by each respective automatic contact distributor of the plurality of automatic contact distributors a largest respective relative occupancy difference among the plurality of agents of the automatic contact distributor for each contact type processed by the respective automatic contact distributor;
   means within each of the plurality of automatic contact distributors for transferring the determined, largest relative occupancy difference for each contact type to the network router;
   means for comparing the respective transferred largest relative occupancy difference from each respective contact distributor for each respective control type to each other to identify a selected contact distributor with a highest transferred relative occupancy difference for each contact type to identify for each respective contact type a respective selected automatic contact distributor of the plurality of automatic contact distributors that has a highest difference for the respective contact type;
   means for detecting a contact;
   means for determining a contact type of the detected contact; and
   means within the network router for routing the detected contact to the selected automatic contact distributor of the plurality of automatic contact distributors that provided a largest one of the respective largest relative differences for the determined contact type among the plurality of automatic contact distributors.

16. The apparatus for routing contacts as in claim 15 wherein the means for determining the largest relative occupancy difference among the agents further comprising means for ordering the agents of each automatic contact distributor of the plurality of automatic contact distributors based upon a relative value of a difference between target occupancy and actual occupancy of each agent.

17. The apparatus for routing contacts as in claim 15 further comprising means for transferring an estimate of time until an agent becomes available in an understaffed situation.

18. The apparatus for routing contacts as in claim 15 wherein the means for detecting the contact further comprises means within an interactive voice response unit for receiving a switched circuit contact and detecting contact associated information through a public switch telephone network connection.

19. The apparatus for routing contacts as in claim 18 further comprises means within the interactive voice response unit detecting client for entering routing selection information entered through the switched circuit connection.

20. The apparatus for routing contacts as in claim 19 further comprising means within the interactive voice response unit for transferring the contact associated information and any detected client entered information to the network router.

21. The apparatus for routing contacts as in claim 20 wherein the contact associated information further comprises a telephone number.

22. The apparatus for routing contacts as in claim 21 further comprising means within the network router for determining a destination telephone number for routing the contact based upon the contact associated information and any client entered information.

23. The apparatus for routing contacts as in claim 22 further comprising means within the network router for instructing the interactive voice response unit to re-route the contact to the automatic contact distributor providing the largest relative difference among the plurality of automatic contact distributors for the contact.

24. The apparatus for routing contacts as in claim 21 further comprising a lookup table within the network router for determining a destination telephone number for routing the contact based upon the contact associated information and any client entered information.

25. The apparatus for routing contacts as in claim 15 further comprising defining the contact as an e-mail.

26. The apparatus for routing contacts as in claim 25 further comprising means within the network router for determining a routing destination for the e-mail based upon call associated information of the e-mail.

27. The apparatus for routing contacts as in claim 26 further comprising means within the network router for instructing an e-mail server to re-route the contact to the automatic contact distributor providing the largest relative difference among the plurality of automatic contact distributors for the e-mail.

28. The apparatus for routing contacts as in claim 15 further comprising defining the contact as an instant message.

29. The apparatus for routing contacts as in claim 28 further comprising means within the network router for determining a routing destination based upon call associated information of the instant message.

30. An apparatus for routing a contact with a client to one of a plurality of automatic contact distributors, each having a plurality of agents, by a network router, such apparatus comprising:
an enterprise server of each respective automatic contact distributor of the plurality of automatic contact distributors, each enterprise serves respective determining a respective largest relative occupancy difference among the plurality of agents of the respective automatic contact distributor for each contact type processed by the respective automatic contact distributor;
a communication processor of each enterprise server of the plurality of automatic contact distributors that is adapted to transfer the determined, largest relative difference for each contact type of each respective automotive contact distributor to the network router wherein the network router compares the respective transferred largest relative occupancy difference from each respective contact distributor for each respective control type to each other to identify a selected contact distributor with a highest transferred relative occupancy difference for each contact type to identify for each respective contact type a respective selected automatic contact distributor of the plurality of automatic contact distributors that has a highest difference for the respective contact type;
a load balancing system that detects a contact and that determines a contact type of the detected contact; and
the network router within the load balancing system that routes the detected contact to the selected automatic contact distributor of the plurality of automatic contact distributors that provided a largest one of the respective largest relative occupancy difference for the determined contact type among the plurality of automatic contact distributors.

31. The apparatus for routing contacts as in claim 30 wherein the enterprise server further comprising an ordering processor that orders the agents of each automatic contact distributor of the plurality of automatic contact distributors based upon a relative value of a difference between target occupancy and actual occupancy of each agent.

32. The apparatus for routing contacts as in claim 30 wherein the load balancing system further comprises an interactive voice response unit for receiving a switched circuit contact and detecting contact associated information through a public switch telephone network connection.

33. The apparatus for routing contacts as in claim 32 wherein the contact associated information further comprises a telephone number.

34. The apparatus for routing contacts as in claim 30 further comprising defining the contact as an e-mail.

35. The apparatus for routing contacts as in claim 30 further comprising defining the contact as an instant message.

36. A method of routing contacts from a gateway with the public switched telephone network to an agent of one of a plurality of automatic contact distributor, such method comprising the steps of:
determining by each respective automatic contact distributor of the plurality of automatic contact distributors a respective largest relative deviation between a target occupancy and an actual occupancy for each agent of the respective automatic contact distributor and for each contact type processed by the respective automatic contact distributor;
transferring a value of the respective determined largest relative difference for each respective contact type to a network router by each of the plurality of automatic contact distributors along with an identifier of the respective automatic contact distributor and the respective contact type;
comparing the respective transferred largest relative occupancy difference from each respective contact distributor for each respective control type to each other to identify a selected contact distributor with a highest transferred relative occupancy difference for each contact type to identify for each respective contact type a respective selected automatic contact distributor of the plurality of automatic contact distributors that has a highest difference for the respective contact type;
the network router detecting a contact arriving at the gateway;
the network router determining a contact type of the detected contact from contact associated information; and
the network router routing the detected contact to the selected automatic contact distributor of the plurality of automatic contact distributors with a largest of the transferred values for that contact type among the plurality of automatic contact distributors.

* * * * *